United States Patent [19]
Beckhardt

[11] Patent Number: 6,138,124
[45] Date of Patent: *Oct. 24, 2000

[54] FIELD LEVEL REPLICATION METHOD

[75] Inventor: Steven R. Beckhardt, Nashua, N.H.

[73] Assignee: International Business Machines, Armonk, N.Y.

[*] Notice: This patent is subject to a terminal disclaimer.

[21] Appl. No.: 09/094,216

[22] Filed: Jun. 9, 1998

Related U.S. Application Data

[63] Continuation of application No. 08/584,958, Jan. 11, 1996, Pat. No. 5,787,441.

[51] Int. Cl.$^7$ .................................................. B06F 17/30
[52] U.S. Cl. .............................. 707/201; 707/8; 711/141; 711/142; 711/146; 395/182.18; 395/670; 395/680
[58] Field of Search ..................... 707/201, 8; 711/141, 711/142, 146; 395/182.18, 670, 680

[56] References Cited

U.S. PATENT DOCUMENTS

| | | | |
|---|---|---|---|
| 4,714,996 | 12/1987 | Gladney et al. | |
| 5,408,563 | 4/1995 | Josten et al. | 395/600 |
| 5,459,862 | 10/1995 | Garliepp et al. | 395/600 |
| 5,613,113 | 3/1997 | Goldring | 395/618 |
| 5,649,195 | 7/1997 | Scott et al. | 395/617 |
| 5,671,407 | 9/1997 | Demers et al. | 395/608 |

FOREIGN PATENT DOCUMENTS 0 117 281 A2  5/1984  European Pat. Off. .

OTHER PUBLICATIONS

Chou, Hong–Tai et al.; "Versions and Change Notification in an Object–Oriented Database System"; Jun. 12, 1988; pp. 275–281.

*Primary Examiner*—Paul V. Kulik
*Assistant Examiner*—Jean M. Corrielus
*Attorney, Agent, or Firm*—Brown Raysman Millstein Felder & Steiner

[57] ABSTRACT

In a distributed computing system in which replicas of a document are separately stored and revised, the document containing data arranged in a number of fields, a method for replicating data contained in a revised document replica to the other of the replicas by replicating only the field or fields which have been revised since an earlier replication. The method includes the steps of dynamically maintaining a two byte document sequence number for each of the document replicas representing the number of revisions made to the replicas, and dynamically maintaining a one byte field sequence number for each of the fields in the replicas. The field sequence numbers for revised fields are set equal to the lower byte of the current document sequence number. When a replication is desired, the method involves determining which of the document replicas is more recently revised, determining which of the fields in the more recently revised replica are more recently revised than the corresponding fields in the other replica based on some or all of the field and document sequence numbers, and replicating only the data contained in each more recently revised fields to the corresponding fields in the other replica. The system can handle document sequence numbers greater than 256, in which field sequence numbers can no longer be accurately represented by one byte, by artificially incrementing field sequence numbers for unrevised fields and interpreting all field sequence numbers as having a value within 256 of the document sequence number.

6 Claims, 2 Drawing Sheets

FIELD LEVEL REPLICATION METHOD

This application is a continuation of application Ser. No. 08/584,958, filed Jan. 11, 1996, now U.S. Pat. No. 5,787,441.

BACKGROUND OF THE INVENTION

This invention relates generally to the field of document replication in a distributed computing system and, in particular, to a method for replicating a document at the field level.

In some existing distributed computing systems such as LOTUS® NOTES software, available from Lotus Development Corporation of Cambridge, Mass., data is copied and stored in multiple documents which are stored separately on multiple computer systems connected or connectable over a network. A document may be one record which is part of a database containing numerous such records, or may be an individual file storing text or other data. Each document contains a number of fields containing different types of information. For example, one type of document is a memorandum that includes the fields "to", "from", "subject", "body", "approvals", etc. Other types of documents include other field types for text, numbers, or other conventional database subject matter.

One copy of the document in such a system may be considered the central or master copy stored on one server in a network, and the others are replicas stored on other servers with which users can work. Users then replicate changes they make in their document replicas to the master document either periodically or upon request, and the master is used to pass along these changes to the other working replicas of the document on a periodic basis, such as at the end of a business day.

In general, in these systems, when a document is replicated, the entire document is copied. However, typically only small portions of a document are changed between replications, and replication of the entire document thus wastes time and resources. One possible solution to this problem, not believed to have been implemented, is to time stamp each field in the document and compare the time stamps of the fields in the document to be replicated to the time stamps of corresponding fields in the unchanged document to determine which fields have been revised since the previous document replication. However, a full time stamp needed to implement this solution requires eight bytes per field in order to represent, among other possible information, the year, month, day, and time of day of the latest revision. The need for eight bytes per field, with numerous fields per document and numerous documents per computer system, represents a substantial commitment of computing resources such as additional storage capacity and replication time.

Thus, there remains a need for a method by which documents can be replicated at the field level without requiring the commitment of substantial resources to determine which fields in a document have been revised.

SUMMARY OF THE INVENTION

It is an object of the present invention to solve the problems described above associated with existing document replication systems.

It is another object of the present invention to provide for field level replication in a distributed computing system.

It is another object of the present invention to provide a method for determining which fields in a document have been revised since a previous document replication.

Some or all of the above and other objects of the present invention are achieved by a method for replicating revised data contained in one of two documents to the other of the documents by replicating only the field or fields which have been revised. The documents are stored in a distributed computing environment in which each of the two documents contains data arranged in a plurality of fields, at least some of the fields of one of the documents corresponding to at least some of the fields of the other of the documents. At least two fields in each document are revisable. The method involves dynamically maintaining a document sequence number for each of the documents representing the number of revisions made to each of the documents, and dynamically maintaining a field sequence number for each of the revisable fields. When a replication is to be made, the method involves determining which of the documents is more recently revised, and determining which one or more fields in the more recently revised document need to be replicated by virtue of being more recently revised. The data contained in each more recently revised field is replicated to the corresponding field in the other of the documents.

In preferred embodiments, the step of dynamically maintaining each document sequence number comprises counting the number of revisions to the document using m bits to represent each document sequence number, and the step of dynamically maintaining each field sequence number comprises using n bits to represent each field sequence number, wherein n is less than m. In the preferred embodiments, m=16 and n=8, so that each document sequence number is represented by two bytes and each field sequence number by one byte. The value of the field sequence number is set equal to the lower n bits of the document sequence number when the field is revised.

In some embodiments, the step of determining which one or more fields need to be replicated involves determining, for each field, an actual value for the field sequence number based on the field sequence and document sequence numbers, and comparing the actual values so determined to determine which of the corresponding fields is more recently revised. Alternatively, the step of determining which fields need to be replicated comprises determining actual values for field sequence numbers and comparing these actual values to the document sequence number of the other document to determine whether the field has been revised since a previous replication.

In either case, the step of determining the actual value for the field sequence number involves computing the difference between the document sequence number and the field sequence number for the field, and, if the difference is greater than $2^n-1$, adding $2^n$ to the field sequence number to determine the actual value.

In accordance with further aspects of the invention, the step of dynamically maintaining the field sequence numbers further comprises, if the document sequence number exceeds $2^n$, artificially incrementing the field sequence numbers associated with other fields in the document which have not been revised in the immediately preceding revision. A field sequence number for an unrevised field is artificially incremented when it is equal to the lower n bits of the document sequence number, and after being so incremented it is no longer equal to the lower n bits. The field sequence numbers need only be incremented by 1 to accomplish this, but in the preferred embodiments are incremented by $2^{(n-1)}$.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

The preferred embodiments of the present invention will be described herein with reference to the flow charts in FIGS. 1 and 2. The flow charts represent one possible way in which the invention may be implemented in an application program operating on a distributed computing system. One skilled in the art will recognize that the present invention may be implemented in a program in many other ways.

Figure 1:
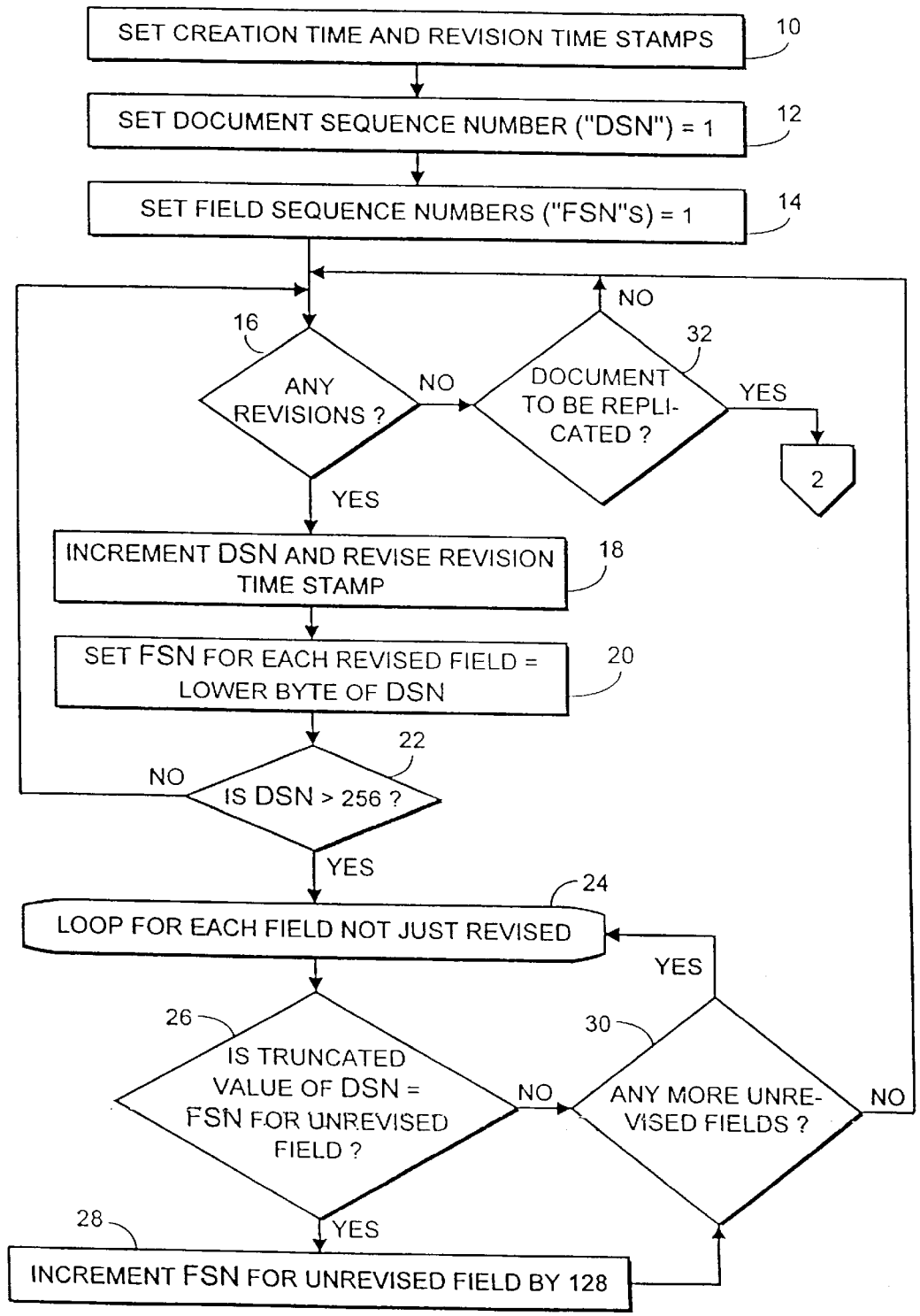
FIG. 1 is a flow chart showing the process of counting revisions and dynamically maintaining document and field sequence numbers in accordance with one preferred embodiment of the invention.
Figure 2:
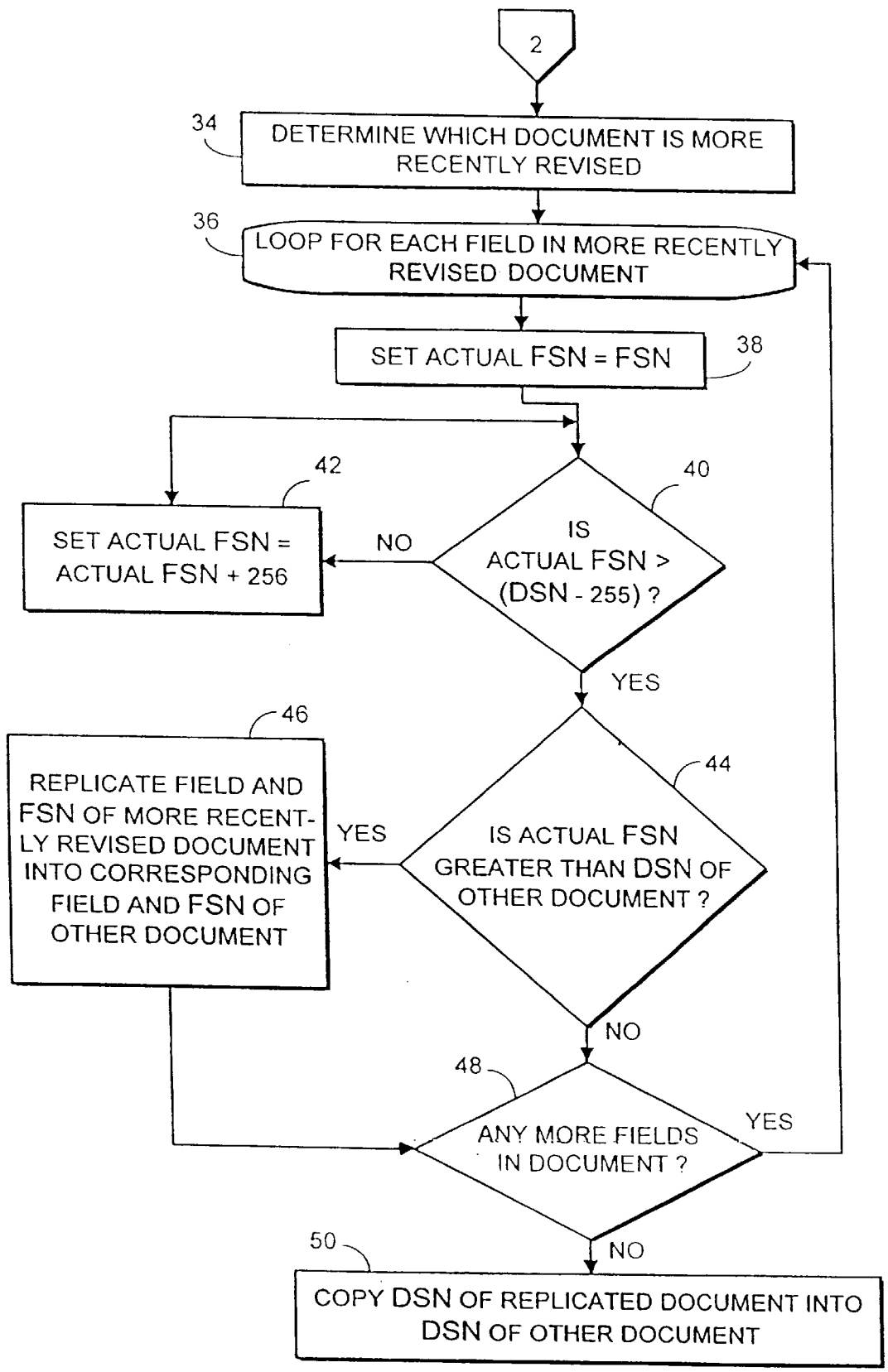
FIG. 2 is a flow chart showing the process of replicating a document at the field level in accordance with one preferred embodiment of the present invention.

In accordance with the invention, as shown in FIG. 1, each document is stamped, step 10, with an eight byte creation time stamp storing the year, month, day and time of day at which the database was first created and an eight byte revision time stamp storing the year, month, day and time of day at which the database was most recently revised. Each document is also stamped with a document sequence number ("DSN") represented by m bits in memory, in which is stored the number of revisions made to the document. A revision is registered and the DSN is accordingly incremented every time the document is edited and saved.

In the preferred embodiments, the DSN is represented in two bytes (i.e., m=16 bits), which allows for a maximum count of $2^{16}$=65,536 revisions to the document before the DSN rolls over past 0 and back to a value of 1. The initial value of the DSN for a new document is set to 1, step 12, which indicates that the initial document is version 1 of the document.

Each document contains a number of fields, as explained above. Each field is assigned a field sequence number ("FSN"), represented by n bits in memory. In the preferred embodiments, n is less than m, thus reducing the amount of memory required to store the FSNs in accordance with certain aspects of the present invention. In these embodiments, the FSN stores the value of the lower n bits of the m bit DSN at the time the field was last revised. In the preferred embodiments, each FSN is represented by one byte (i.e., n=8), which allows for $_2{}^8$=256 distinct values. As with the DSN, the initial value of each FSN is set to 1, step 14, which indicates that the field was last revised, i.e. by being created, when the DSN=1.

If a revision is made to data in one or more fields in a document and the document is saved, step 16, the DSN for the document is incremented by one and the revision time stamp is revised, step 18. The FSN for each revised field is then set equal to the truncated value of the DSN, i.e., the value stored in the lower byte of the DSN, step 20. For example, in a document containing Fields A, B, and C, if the current DSN (the DSN prior to the latest revision) had a value of 10, the FSN for Field A had a value of 2 (indicating that Field A was last revised at DSN=2), and Field A is revised, the DSN is incremented to 11 and the FSN for Field A is set to 11, indicating that Field A was last revised at the version of the document in which DSN=11.

In accordance with the invention, by maintaining separate FSNs indicating the latest point at which each field was revised, FSNs of corresponding fields in multiple. copies of documents can be compared, as explained further below, to determine which of the corresponding fields has been revised most recently. Alternatively, FSNs of a more recently revised document can be compared to the DSN of a less recently revised document to determine whether the fields have been revised since a previous replication. Once the system determines which fields have been revised, only those fields, and not the entire document, need be replicated.

Because each FSN is only assigned one byte, it is difficult if not impossible to determine from the FSN alone whether the actual number of revisions counted in the FSN represents the FSN's absolute value or its value plus an integer multiple of $2^n$, 256 in the preferred embodiments. For example, a value of 2 stored in a FSN could represent an actual FSN of 2, or an actual FSN of 2+256=258 or $\angle$ plus some other integer multiple of 256. In other words, it would be difficult if not impossible to determine from the FSN alone whether the field was last revised at DSN=2, DSN=258, or some higher DSN.

To solve this problem, the DSN may be used to determine the actual value of the FSN because the DSN indicates the number of revisions for the entire document. In general, if the DSN is not 255 greater than the FSN, then the FSN represents the actual FSN. If the DSN is more than 255 greater than the FSN, then the actual FSN may be the FSN plus an integer multiple of 256. For example, in a document having three fields, Fields A, B, and C, if Field A has a FSN=3, Field B has a FSN=10 and Field C has a FSN=20, the DSN is checked to determine whether the FSNs for any of Fields A, B, or C represent an actual FSN value of 256 more than its face value. If the DSN is 20, then none of the fields has an actual FSN greater than 256. If the DSN is 259, then at least one of the fields has an actual FSN greater than 256, because at least one of the fields must have been revised at DSN=259. In this case, it is clear that Field A must have an actual FSN of 259, while Fields B and C have actual FSNs of 10 and 20, respectively, because they can not have FSNs of 10 or 20 plus 256, which would be greater than the DSN of 259.

However, an anomaly occurs when at least one field has an actual FSN which is 256 or more than the actual FSNs of other fields. In that case, it is difficult if not impossible to determine which field has an actual FSN greater than its face value. For example, in the document described above with three fields, if after a previous replication, Field A has a FSN with a value of 255, Fields B and C have FSNs with a value of 1, and the DSN has a value of 255, and Field A is changed six more times before the next replication is to be made, the DSN is incremented to 261 and the FSN for Field A is set to 5 (=261–256, or the value of the lower byte of the DSN). It is then impossible to determine by the FSNs and DSN whether the FSN for Field A actually represents 261 and/or whether the FSNs for Fields B and/or C actually represent 257. When this occurs, Fields B and C may be unnecessarily or incorrectly replicated.

If the bit size of the FSN is sufficiently large, the frequency of this occurrence is kept to a minimum. Thus, with a FSN of one byte, a document would have to be revised over 256 times in order for this problem to arise. However, in accordance with the present invention, this problem is alternatively solved by artificially incrementing the FSN for the fields which are not changed, without correspondingly incrementing the DSN, so that the actual FSN for the unchanged field is never allowed to be more than 255 less than the DSN. In the example set forth above, when the DSN reaches 257, the FSNs for Fields B and C are artificially incremented so that their values are not more than 255 less than the DSN. All FSNs are then interpreted to be within a distance of 256 from the DSN.

It is only necessary to increment the FSN for each of Fields B and C by 1 each time the DSN becomes too large relative to the FSN. This requires those FSNs to be artificially incremented by 1 every time the other field is revised. In the preferred embodiment, the FSN is incremented by 128 ($=2^n/2=2^{n-1}$, where n=8) so that it need not be incremented every time and so that it can take on only 1 false value, i.e., its correct value plus 128. If the same FSN needs to get incremented again to account for this problem, it would be incremented by 128, thus returning it to its correct value. This property is useful for debugging.

Returning to FIG. 1, after a revision has been made and the DSN and FSNs for revised fields have been set as described above, the system checks whether the DSN is greater than 256, step 22. If not, then the actual FSN for each field is the face value of the FSN, and the problems explained above do not arise. If the DSN has exceeded 256, the system loops through each of the other fields which have not been just revised, step 24. For each unrevised field, the system compares its FSN to the truncated value of the revised DSN, i.e., the value stored in the lower byte of the DSN, step 26. If these two values are equal, the system artificially increments the FSN by 128, step 28, and the DSN is not simultaneously incremented. This process is continued for each unrevised field until there are no more unrevised fields, step 30, at which point the system is ready to receive further revisions or to replicate the document.

In this way, the system guarantees that a FSN for any unrevised field will not be greater than 255 less than the actual FSN for the most recently revised field, which would create the ambiguity explained above.

Documents may be replicated on a periodic basis, such as at the end of a business day or upon request by a user. If a document is to be replicated, step 32, the process shown in the flow chart of FIG. 2 is implemented. The system determines which of the two documents being compared is more recently revised, step 34, either by comparing their revisions time stamps to determine which is later or their DSNs to determine which is greater. The system then loops through each field in the more recently revised document, step 36, to establish the actual FSN for each field. The actual FSN is found by first setting the actual FSN equal to the value contained in the FSN for the field, step 38, and then determining whether the actual FSN is greater than the DSN for the document less 255, step 40, i.e., whether the FSN is within 256 of the DSN. If it is, no change is made to the actual FSN, and the actual FSN is thus the value as stored in the FSN.

For any FSN not within 256 of the DSN, 256 is added to the actual FSN, step 42, and the revised value of the actual FSN is again checked to see whether it now comes within 256 of the DSN, step 40. In this way, all FSNs are interpreted to be within a distance of 256 from the DSN. This process continues for each field in each of the documents.

Once the actual FSNs for each field are established, the system determines which of the fields in the more recently revised document need to be replicated. In one preferred embodiment, the system determines which fields have actual FSNs greater than the DSN of the less recently revised document, step 44. Each such field satisfying this condition will necessarily have been revised after a previous replication of the document, and thus will need to be replicated again. These fields and FSNs are thus replicated, step 46. The system checks for any additional fields, step 48, and ends the loop if all fields have been processed. After the data is replicated, the value of the DSN of the replicated document is copied into the DSN of the document which received the replicated data, step 50. As a result of this replication process, the documents will have identical data, DSNs, and FSNs for corresponding fields.

In other embodiments, the system determines which fields need to be replicated by finding the actual FSNs of both documents and comparing the actual FSNs of corresponding fields to determine which is greater. The fields with greater FSNs are replicated. This process is particularly suitable when the documents have not previously been replicated.

Unnecessary replications of fields which have not in fact changed sometimes occur. For example, in the preferred embodiment, in a document having two fields, Fields A and B, if Field B has an actual FSN=1 when the DSN is incremented to 257 and Field A assumes an actual FSN of 257, represented by a FSN with a face value of 1, Field B's FSN gets incremented by 128 to a FSN of 129, in accordance with the present invention as described herein. Field B will be unnecessarily replicated only if there has not been a replication between two replicas of the document since the DSN was equal to 129. This is because the DSN of the older version of the document will otherwise be greater than 129, and, in accordance with the preferred embodiment, only fields with a FSN greater than 129 will be replicated. Since the DSN in the more recently revised document is now equal to 257, the DSN of the older version of the document will be less than 129 only if the document was modified 128 times between replication cycles, which is highly unlikely and in practice occurs only rarely.

The following example will be helpful in providing an understanding of the invention. Assume a document is created with the fields Author, Creation Date, Revision Date, Subject, Body, and Status, and the following data entered in those fields (FSNs are indicated by brackets following the field, e.g. [1]):

(DSN: 1)
Author: Jane Doe [1]
Creation Date: 12/1/95 [1]
Revision Date: 12/1/95 [1]
Subject: Request for Travel Approval [1]
Body: I'd like to request approval for a trip to New York City [1]
Status: Request submitted [1]

Now assume a manager edits this document, requests more information, and adds a Managers Comment field. The document then has the following structure:

(DSN: 2)
Author: Jane Doe [1]
Creation Date: 12/1/95 [1]
Revision Date: 12/2/95 [2]
Subject: Request for Travel Approval [1]
Body: I'd like to request approval for a trip to New York City [1]
Managers Comment: Could you provide more justification for this trip please. [2]
Status: Request submitted [1]

The Revision Date field has been revised and its FSN set to the current DSN of 2.

In addition, the Managers Comment field is added and its FSN is set to 2 to indicate that it was last revised (by being created) in document DSN=2. If a replication is desired, this document is compared to the previous version of the document and a comparison of the Revision Date stamp indicates that this version is more recently revised and should be replicated. The FSNs for each field are then compared to the DSN of the older document determine which fields have been revised since the document was least revised. This comparison results in the Revision Date and Managers Comments fields being replicated, while the other fields are not replicated.

If the data in the Body field is then edited to provide more information, the document has the following structure:
(DSN: 3)
Author: Jane Doe [1]
Creation Date: 12/1/95 [1]
Revision Date: 12/3/95 [3]
Subject: Request for Travel Approval [1]
Body: I'd like to request approval for a trip to New York City. The purpose of the trip is to visit several customers. [3]
Managers Comment: Could you provide more justification for this trip please. [2]
Status: Request submitted [1]

The FSN for the Body field is set equal to 3, which is the incremented value of the lower byte of the DSN. A replication of this document over the previous document results in only the Revision Date and Body fields being replicated.

If the manager approves the travel request, the document would appear as follows:
(DSN: 4)
Author: Jane Doe [1]
Creation Date: 12/1/95 [1]
Revision Date: 12/4/95 [4]
Subject: Request for Travel Approval [1]
Body: I'd like to request approval for a trip to New York City. The purpose of the trip is to visit several customers [3]
Managers Comment: Could you provide more justification for this trip please. [2]
Status: Approved [4]

The Status field has been revised, and assumes a FSN equal to the new DSN of 4. The above example is typical of the course taken by many documents, and shows that replicating only the fields that have changed is clearly advantageous over replicating the entire document. This is particularly true when large fields like the Body field are not revised and smaller fields such as Revision Date and Status are revised. This is common, especially in workflow applications.

In the preferred embodiments of the invention as described herein, each FSN is represented by only one byte per field, yet the system can still handle the case of more than 255 modifications for a given field. If, in the example, Jane Doe and the manager have a protracted negotiation over the trip, the document could end up with the following structure:
(DSN: 256)
Author: Jane Doe [1]
Creation Date: 12/1/95 [1]
Revision Date 12/20/95 [0]
Subject: Request for Travel Approval [1]
Body: I'd like to request approval for a trip to New York City. The purpose of the trip is to visit several customers. The customers are Acme Computer, Storm Door Corp., and
Bells and Whistles, Inc. [266]
Managers Comment: I still need more justification for this trip. [0]
Status: More information needed. [4]

Two fields, Revision Date and Managers Comment, have FSNs of zero. The zero values indicate that those fields were last revised at a DSN=256, because when 256 is stored in a byte field it is truncated and stored as zero. If the document is revised one more time, the DSN is incremented to 257 and the Revision Date field, among others which may be revised, is set to the DSN value. The problem, as described above, is that when this is stored in a byte sized FSN field it will store as the value 1, which will make it look like other, unrevised fields were revised as well (e.g., the Author and Subject fields, which have FSNs=1). Thus, in accordance with one aspect of the present invention, as the document is stored, the system increments the DSN to 257 and then determines whether the truncated value of the DSN (in this case 1) will match the FSNs of any of the unmodified fields. In this example, it will. Thus, the unmodified fields with FSN=1 (Author, Creation Date, and Subject) are adjusted by adding 128 to them.

As a result, the document will have the following structure:
(DSN: 257)
Author: Jane Doe [129]
CreationDate: 12/1/95[129]
Revision Date: 12/21/95 [1]
Subject: Request for Travel Approval [129]
Body: I'd like to request approval for a trip to New York City. The purpose of the trip is to visit several customers. The customers are Acme Computer, Storm Door Corp., and
Bells and Whistles, Inc. If we don't visit these customers and solve their problems, they may switch to one of our competitors. [1]
Managers Comment: I still need more justification for this trip. [1]
Status: More information needed. [4]

The revised Body field has a FSN=1, the unrevised Author, Creation Date, and Subject fields now have FSNs which have been artificially incremented to 129. As a result, the system can determine that FSNs with a face value of 1 have actual values of 257. The fields whose FSNs were artificially incremented to 129 in this example will only be unnecessarily replicated if there has not been a replication between two replicas of this document since DSN=129, which is generally unlikely to occur a long as documents are replicated on a regular basis. If there has been such a replication, the DSN of the older version of the document will be greater than 129, and the system determines that no replication of fields with actual FSNs of 129 or less is necessary.

To complete the above example, if the manager approves the request, the document has the following final structure:
(DSN: 258)
Author: Jane Doe [129]
Creation Date: 12/1/95 [129]
Revision Date: 12/21/95 [2]
Subject: Request for Travel Approval [129]
Body: I'd like to request approval for a trip to New York City. The purpose of the trip is to visit several customers. The customers are Acme Computer, Storm Door Corp., and
Bells and Whistles, Inc. If we don't visit these customers and solve their problems, they may switch to one of our competitors. [1]
Managers Comment: Okay, sounds good. [2]
Status: Approved [2]

The Revision Date, Managers Comment, and Status fields are now assigned FSNs=2, reflecting that they were last revised at DSN=258.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

What is claimed is:

1. In a distributed computing environment in which each of two documents contains data arranged in a plurality of fields, at least some of the fields of one of the documents corresponding to at least some of the fields of the other of the documents, and at least two fields in each document being revisable, a method for replicating data contained in one of the documents to the other of the documents by replicating only the field or fields which have been revised, the method comprising:

dynamically maintaining a document sequence number for each of the documents representing the number of revisions made to each of the documents;

dynamically maintaining a field sequence number for each of the revisable fields;

when a replication is to be made, determining which of the documents is more recently revised;

determining which one or more fields in the more recently revised document are more recently revised than the corresponding one or more fields in the other of the documents based on some or all of the field sequence numbers and document sequence numbers; and replicating the data contained in each more recently revised field to the corresponding field in the other of the documents.

2. The method of claim 1 wherein the step of determining which of the documents is more recently revised comprises comparing the document sequence numbers of the documents to determine which is greater.

3. The method of claim 1 further comprising stamping each document with a revision time stamp and updating the revision time stamp when each document is revised, and wherein the step of determining which of the documents is more recently revised comprises comparing the revision time stamps of the documents to determine which represents a later time.

4. In a distributed computing system in which replicas of a document are separately stored and revised, the document containing data arranged in a plurality of fields and being periodically replicated, a method for replicating a document comprising:

dynamically maintaining a document sequence number for each of the document replicas representing the number of revisions made to each replica;

dynamically maintaining a field sequence number for each of the fields in each replica;

determining which of the document replicas is more recently revised;

determining which field or fields in the more recently revised replica have been revised since a previous replication of the document based on some or all of the field and document sequence numbers; and replicating the data contained in each revised field to the corresponding field in the other replica.

5. A method comprising:

storing a document sequence number for a document and a field sequence number for each of a plurality of revisable fields contained within the document;

incrementing the document sequence number each time a revision to one or more of the fields in the document is registered; and setting a first new value for each field sequence number corresponding to each of one or more fields in the document which have been revised, wherein the new value is set based on the incremented document sequence number.

6. A method for replicating data from a first document to a second document, each document containing data arranged in a plurality of fields, at least some of the fields of the first document corresponding to at least some of the fields of the second document, the first document having a first document sequence number representing the number of revisions to the first document, the second document having a second document sequence number representing the number of revisions to the second document, the plurality of fields each having a field sequence number, the method comprising the steps of:

identifying one or more field sequence numbers of the plurality of field sequence numbers of the first document having a higher value than the second document sequence number; and replicating the data in each field of the first document having a field sequence number of higher value than the second document sequence number to the corresponding field of the second document.

* * * * *